United States Patent
Shen

(10) Patent No.: US 6,664,360 B2
(45) Date of Patent: Dec. 16, 2003

(54) PREPARATION OF WATER-REDUCING COPOLYMERS FOR CONCRETE

(75) Inventor: Jianzhong Shen, Audubon, PA (US)

(73) Assignee: Arco Chemical Technology, L.P., Greenville, DE (US)

( * ) Notice: Subject to any disclaimer, the term of this patent is extended or adjusted under 35 U.S.C. 154(b) by 0 days.

(21) Appl. No.: 10/200,859

(22) Filed: Jul. 23, 2002

(65) Prior Publication Data

US 2003/0060594 A1 Mar. 27, 2003

Related U.S. Application Data

(62) Division of application No. 09/788,699, filed on Feb. 20, 2001, now abandoned.

(51) Int. Cl.[7] .............................................. C08G 18/62
(52) U.S. Cl. .............................. 528/75; 524/5; 524/591; 524/840; 106/823; 525/123
(58) Field of Search ............................ 524/5, 840, 591; 106/823; 528/75; 525/123

(56) References Cited

U.S. PATENT DOCUMENTS 5,854,386 A * 12/1998 Shen et al.
6,034,208 A * 3/2000 McDaniel et al.

* cited by examiner

Primary Examiner—Rachel Gorr
(74) Attorney, Agent, or Firm—Wiggin & Dana

(57) ABSTRACT

Alkoxylated acrylate and methacrylate macromonomers are disclosed that are useful in the preparation of water-reducing additives for concrete, ultraviolet light-curable adhesives, and water-dispersed polyurethanes. The macromonomers are suitably prepared by alkoxylating a hydroxyalkylacrylate or hydroxyalkylmethacrylate in the presence of a DMC catalyst using the continuous addition of starter (CAOS) in order to prevent the formation of by-products during the fabrication of the macromonomer.

2 Claims, No Drawings

PREPARATION OF WATER-REDUCING COPOLYMERS FOR CONCRETE

This is a division of application Ser. No. 09/788,699, filed Feb. 20, 2001, now abandoned.

FIELD OF THE INVENTION

This invention relates generally to alkoxylated acrylate and methacrylate macromonomers useful for preparing water-reducing additives for concrete, ultraviolet light (UV)-cured adhesives, and water-dispersed polyurethanes. The macromonomers are prepared using the continuous addition of starter in order to minimize the by-product formation during the alkoxylation reaction used to produce the macromonomer.

BACKGROUND OF THE INVENTION

Polyols produced using a double metal cyanide (DMC) catalyst are known to possess advantageous properties, such as low ethylenic unsaturation. Particularly preferred polyols made using these DMC catalysts are produced using a continuous addition of starter, together with optional initially charged starter, during the polymerization of epoxide to produce the desired polyol, as described in more detail in U.S. Pat. No. 5,777,177. The '177 patent teaches the use of water or a low molecular weight polyol as the starter, and discloses that the resulting polyol has a reduced amount of high molecular weight tail.

The continuous addition of other starters, such as hydroxypropylmethacrylate (HPMA) to initiate the polymerization of an epoxide, such as propylene oxide or ethylene oxide, in the presence of a DMC catalyst, is described in U.S. Pat. No. 5,854,386, notably at column 3, lines 13–16, and column 6, lines 15–18 thereof. The '386 patent discloses that this methodology is useful in preparing stabilizers for polymer polyols and impact modifiers made by reacting the stabilizer with one or more polymerizable vinyl monomers. This process is described in more detail in the paragraph bridging columns 7 and 8 of that patent. The '386 patent is incorporated herein by reference in its entirety.

Due to the hydrophobic nature of many polyurethanes, there is a need to employ a dispersion stabilizer when preparing water-dispersed polyurethanes in order to prevent the dispersion from "breaking" by virtue of precipitation or agglomeration of the polyurethane component. Conventional dispersion stabilizers for water-dispersed polyurethanes are typically expensive, and oftentimes do not perform as well as might be desired. For example, 2,2-dimethyol propionic acid (DMPA) is costly, in short supply, and typically does not provide acid groups in the desired location on the urethane molecule, namely in the middle of the hydrophobic polyether portion of the molecule, upon reaction with an isocyanate.

There currently is a need in the polyurethanes manufacturing community for inexpensive, homogeneous macromonomer compositions that are useful in preparing water-dispersed polyurethanes having alcohol water-dispersing moieties in a middle portion of the urethane molecules. The present invention provides one solution to this need by using "continuous addition of starter" (CAOS) methodology to prepare alkoxylated macromonomers, such as propoxylated acrylate- and propoxylated methacrylate- macromonomers. These macromonomers can be copolymerized with an acid, or combination of acids, to produce a stabilizer for water-dispersible polyurethanes. Alternatively, these macromonomers can be co-polymerized with a monomer, or combination of monomers, to produce copolymers that are useful as additives in concrete-forming compositions. These additives permit the use of a reduced amount of water in fabricating the concrete, and provide a further improvement over the water-reducing agents described in co-pending U.S. application Ser. No. 09/358,009 filed Jul. 21, 1999. These copolymers are also useful as additives in UV-curable adhesives in order to enhance the adhesive's performance.

SUMMARY OF THE INVENTION

One aspect of this invention provides an improved process for producing an alkoxylated acrylate macromonomer or an alkoxylated methacrylate macromonomer. The alkoxy moiety of the macromonomer contains between one and six carbons. In the process, a first component, namely a hydroxyalkylacrylate or a hydroxyalkylmethacrylate, is reacted with a second component, namely an alkylene oxide compound (preferably an alkylene oxide selected from the group consisting of ethylene oxide, propylene oxide, butylene oxide, and combinations thereof). The macromonomer is produced by co-feeding the reactants into the reaction vessel co-currently or counter-currently, and carrying out the reaction at a reaction temperature of between about 60° C. and about 130° C. in the presence of a DMC catalyst, and optionally in the presence of a solvent. The reaction employs a CAOS method whereby the first component is added to a reactor already containing at least some amount of the second component. Use of this CAOS method facilitates production of the desired macromonomer, and reduces the likelihood of forming unwanted byproducts.

In another aspect, the present invention comprises co-polymerizing the above-described macromonomer with a monomer selected from the group consisting of acrylic acid, methacrylic acid, fumaric acid, styrene, maleic acid, methyl methacrylate, and combinations thereof. The resulting copolymer is useful as a water-reducing additive for concrete formation. When this water-reducing additive is present in a reaction mixture comprising sand, cement, and water, less water is needed than the amount that is necessary to prepare concrete in the absence of the water-reducing additive.

In still another aspect, this macromonomer, and its derivatives, can be used as a performance-enhancing additive for a UV-curable adhesive.

In yet another aspect, the above-described macromonomer can be used in the preparation of water-dispersible polyurethanes. For this use, the macromonomer is co-polymerized with a monomer selected from the group consisting of acrylic acid, methacrylic acid, fumaric acid, maleic acid, and combinations thereof, in order to produce a co-polymer containing hydroxyl and acid moieties. At least a portion of the hydroxyl moieties on the copolymer are then reacted with an isocyanate to provide the water dispersible polyurethane.

These and other aspects of the present invention will become apparent upon reading the following detailed description of the invention.

DETAILED DESCRIPTION OF THE INVENTION

It has now been surprisingly found that macromonomers produced in accordance with the present invention using a continuous addition of starter methodology are particularly useful in fabricating water-reducing additives for concrete-forming compositions, in producing dispersants for water-dispersible polyurethanes and performance enhancing additives for UV curable compositions. Illustratively, the macromonomers are reacted with a vinyl monomer to produce a co-polymer that is useful as a water-reducing additive (WRA) in concrete-forming compositions.

The macromonomers are prepared at a relatively low reaction temperature (between about 60 degrees and about 130 degrees Centigrade, preferably between about 60° C. and about 110° C.) in the presence of a relatively low concentration of a DMC catalyst (5 ppm to 500 ppm, preferably 5 ppm to 50 ppm), optionally in the presence of a solvent. The relatively low concentration of DMC catalyst, together with the relatively low reaction temperature, has been found by the present inventor to reduce or minimize the homopolymerization of the acrylate and methacrylate reactants. These reaction parameters have also been found to reduce or minimize the trans-esterification of hydroxyalkyl methacrylate and hydroxyalkylacrylate to form unwanted di-methacrylate and di-acrylate by-products. These byproducts are undesirable since they would be detrimental to the present inventor's envisioned use of the macromonomers as intermediates in the production of dispersants for water-dispersed polyurethanes, as well as the other uses described herein.

The macromonomers produced in accordance with the present invention are made using CAOS methodology wherein the methacrylate or acrylate "starter" is continuously added during the course of the reaction. The alkylene oxide compound employed in oxyalkylating the "starter" or "initiator" may be any alkylene oxide polymerizable with DMC catalysts.

Suitably, the alkylene oxide is selected from the group consisting of ethylene oxide, propylene oxide, butylene oxide, and combinations thereof. Illustrative compounds include ethylene oxide, propylene oxide, 1,2- and 2,3-butylene oxide, C6–30 alpha-olefin oxides, glycidol, and halogenated alkylene oxides. Preferred are propylene oxide and ethylene oxide.

Mixtures of more than one alkylene oxide many be used, for example, mixtures of propylene oxide and ethylene oxide. Alkylene oxides, and their mixtures, may be polymerized onto the initiator molecules in one or more stages, to produce homopolymers, block copolymers, random copolymers, block random copolymers and the like. "Copolymer" in the present application includes "terpolymer" and mixtures of more than three alkylene oxides as well.

Other co-monomers may be polymerized along with the alkylene oxide. Examples of copolymerizable monomers include those disclosed in U.S. Pat. Nos. 3,278,457; 3,278,458; 3,404,109; 3,538,043; 3,900,518; 3,941,849; 4,472,560; 5,145,833; and 5,223,583 which are herein incorporated by reference. Glycidol is a particularly preferred copolymerizable monomer, and it may be used to introduce additional hydroxyl functionality.

Suitable DMC catalysts are well known to those skilled in the art. DMC catalysts are non-stoichiometric complexes of a low molecular weight organic complexing agent, and optionally other complexing agents, with a double metal cyanide salt, e.g. zinc hexacyanocobaltate. Exemplary DMC catalysts include those suitable for preparation of low unsaturation polyoxyalkalene polyether polyols, as disclosed in U.S. Pat. Nos. 3,427,256; 3,427,334; 3,427,335; 3,829,505; 4,472,560; 4,477,589; and 5,158,922. Preferably, however, the DMC catalysts used in accordance with the preferred aspects of the present invention are those capable of preparing "ultra-low" unsaturation polyether polyols such as polypropylene glycols and random EO/PO copolymers. The polyoxyalkylene polymers produced by the catalysts typically have levels of unsaturation (other than the purposefully introduced unsaturation of the subject invention starter molecules) less than about 0.010 meq/g, as measured by ASTM D-2849–69, "TESTING OF URETHANE FOAM POLYOL RAW MATERIALS". Such catalysts are disclosed in U.S. Pat. Nos. 5,470,813 and 5,482,908, and 5,545,601, and these patents are incorporated herein by reference in their entirety. Preparation of the macromonomers of the present invention is facilitated using such highly active DMC catalysts.

Oxyalkylation conditions may be varied to suit the particular reactive unsaturation-containing initiator, alkylene oxide, and the like. For example, with liquid or low melting initiators, oxyalkylation may be effected by oxyalkylating neat, while with these same initiators or with solid initiators of higher melting point, oxyalkylation in solution or suspension in an inert organic solvent may be desired. Suitable solvents include aprotic polar solvents such as dimethylsulfoxide, dimethylacetamide, N-methyl-pyrrolidone, dimethylformamide, acetonitrile, methylene chloride, and especially the more volatile hydrocarbon solvents such as benzene, toluene, ethylbenzene, cyclohexane, petroleum ether, methylethylketone, cyclohexanone, diethylether, tetrahydrofuran, and the like.

It has been found that certain hard-to-dissolve initiators may be initially oxyalkylated in suspension in an organic liquid such as toluene, and following oxyalkylation with from 1 to 4 mols of alkylene oxide, will form soluble reaction products which can be further oxyalkylated in solution.

Oxyalkylation temperatures and pressures are conventional when employing vinyl polymerization inhibitors. Temperatures may range from room temperature or below to about 150° C., or higher. Preferably, temperatures in the range of 70° C. to 140° C. are used, more preferably about 70° C. to 110° C. When highly active DMC catalysts capable of producing ultra-low unsaturation (less than 0.010 meq/g) are used, and the reaction is conducted at a low temperature, i.e. below 110° C., and most preferably in the range of 70° C. to 100° C., then polyoxyalkylation can occur at reasonable rates without additional polymerization of the unsaturated moieties present. This is true even in the absence of a vinyl polymerization inhibitor. Alkylene oxide pressure is adjusted to maintain a suitable reaction rate, consistent with the ability of the process system to remove heat from the reactor. Pressures from 2 psia or lower to about 90 psia are useful. A pressure of 2 to 15 psia, 2 to 10 psia when employing propylene oxide, ethylene oxide, or a mixture of these alkylene oxides, may be advantageous.

Catalyst concentration is generally expressed as ppm based on the weight of the product. The amount of catalyst will depend upon the activity of the particular DMC catalyst. When using very active catalysts, such as those disclosed in U.S. Pat. Nos. 5,470,813; 5,482,908; and 5,545,601, amounts from less than 5 ppm to 500 ppm or higher are useful, more preferably from about 15 ppm to about 150 ppm.

In a typical synthetic procedure, the reaction is effected using a continuous addition of the initiator during the course of the reaction as disclosed in copending U.S. application Ser. No. 08/597,781, hereby incorporated by reference. For example, the initiator or initiators may be fed to the reactor continuously, either dissolved in alkylene oxide, dissolved in inert diluent, or, with liquid initiators, neat. The continuous addition of the initiator(s) may also be accompanied by continuous removal of product, resulting in a continuous synthesis process, as disclosed in U.S. application Ser. No. 08/683,356, also incorporated herein by reference.

The oxyalkylation of the reactive-unsaturation containing molecule is suitably conducted in the presence of a vinyl polymerization inhibitor, preferably of the type which function without the presence of oxygen, since oxyalkylations are generally "in vacuo", meaning in this case that virtually the entire reactor pressure is due to alkylene oxide; or in the presence of a gas inert to the process, e.g. argon, nitrogen, etc. In other words, the partial pressure of oxygen, generally, is substantially zero. It is common to flush oxyalkylation reactors with nitrogen one or more times prior to final evacuation and introduction of alkylene oxide. Suitable inhibitors are well known to those skilled in the art of vinyl polymerization. Suitable inhibitors are, for example, butylated hydroxy toluene (BHT), 1,4-benzoquinone, 1,4-napthoquinone, diphenylphenylhydrazine, ferric chloride, copper chloride, sulfur, aniline, t-butyl-catechol, trinitrobenzene, nitrobenzene, 2,3,5,6-tetrachloro-1,4-benzoquinone (chloranil), and the like. BHT is preferred.

The inhibitor should be used in an amount effective to inhibit polymerization of the reactive unsaturation-containing inhibitor. Thus, the amount will vary with the reactivity of the particular type of unsaturation. Acrylates and methacrylates, for example may require higher levels of inhibitor than less reactive unsaturation-containing initiators. The amount of inhibitor will also vary with oxyalkylation temperature, with higher temperatures requiring higher amounts of inhibitor. Amounts of inhibitor, in weight percent relative to the weight of the reactive-unsaturation containing initiator, may vary from about 0.01 weight percent to about 1 weight percent, and more preferably from about 0.05 weight percent to about 0.5 weight percent. The latter range is particularly useful with BHT. If the vinyl polymerization inhibitor is not used, particularly with less active DMC catalysts, the product may be highly colored, or gelling of the product may occur.

Following oxyalkylation, the macromonomer may be vacuum stripped, for example using a stream of nitrogen, to remove unreacted monomers and other volatile components. The products may also be filtered to remove traces of DMC catalysts or their residues, or the products may be subjected to other methods of catalyst removal. When DMC catalysts of the ultra-low unsaturation-producing type are employed, the small amounts of catalysts used may be left in the product, or the product may be subjected to simple filtration to remove the catalysts and their residues.

The macromonomer is suitably reacted with a monomer such as acrylic acid, methacrylic acid, fumaric acid, styrene, maleic acid, methyl methacrylate, and combinations thereof, at a reaction temperature of between about 0° C. and about 100° C., preferably between about 30° C. and about 60° C., to prepare products useful in a variety of applications.

Illustratively, the macromonomer thusly produced may be used to prepare the dispersant for water reducing admixture for concrete, polymer polyol, or water-dispersed polyurethanes by reacting the intermediate with a vinyl monomer, such as acrylonitrile, styrene, acrylic acid, methacrylic acid, methylmethacrylate, methylacrylate, p-methylstyrene, or the like. A vinyl polymerization initiator, e.g. an organic peroxide, hydroperoxide, peroxyester, azo compound, ammonium persulfate, or the like, is optionally added, and polymerization commenced. Examples of suitable free radical polymerization initiators include acyl peroxides such as dihexanoyl peroxide and dilaurolyl peroxide, alkyl peroxides such as t-butyl peroxy-2-ethylhexanoate, t-butylperpivalate, t-amylperoctoate, 2,5-dimethyl-hexane-2,5-di-per-2-ethylhexoate, t-butyl-per-dodecanoate, t-butylperbenzoate and 1,1-dimethyl-3-hydroxybutylperoxy-2-ethylhexanoate, and azo catalysts such as azobis(isobutyronitrile), 2,2'-azo-bis-(2-methylbutyronitrile), and mixtures thereof. Ammonium persulfate and other water-soluble initiators are preferred. Redox initiator systems are also suitable for use in this invention.

The polymerization initiator concentration employed is not critical and can be varied considerably. As a representative range, the concentration can vary from about 0.1 to about 5.0 weight percent or even more, based upon the total feed to the reactor. Up to a certain point, increases in the catalyst concentration result in increased monomer conversion, but further increases do not substantially increase conversion. The particular catalyst concentration selected will usually be an optimum value considering all factors, including costs. It has been determined that low concentrations can be used in conjunction with high potency preferred stabilizers while still obtaining the desired dispersants for water reducing admixture for concrete, water-dispersed polyurethane, and polymer polyol.

In preparing water-dispersible polyurethanes, at least a portion of the hydroxyl moieties present on the co-polymer is suitably reacted with an isocyanate. Any isocyanate may be employed, such as an aromatic isocyanate, i.e. toluene diisocyanate (TDI), or an aliphatic isocyanate, such as hexamethylene diisocyanate (HDI), or combinations thereof. Other useful isocyanates include isophorone diisocyanate (IPDI), ethylene diisocyanate, 1,4-tetramethylene diisocyanate, 2,2,4-trimethyl-1,6-hexamethylene diisocyanate, 1,10-decanemethylene diisocyanate, 1,12-dodecanemethylene diisocyanate, cyclohexane-1,3-diisocyanate, cyclohexane-1,4-diisocyanate, 1-isocyanato-2-isocyanatomethyl cyclopentane, isophorone diisocyanate, bis-(4-isocyanatocyclohexyl)-methane, 1,3- and/or 1,4-bis-(isocyanatomethyl)-cyclohexane, bis-(4-isocyanato-3-methyl-cyclohexyl)-methane, 1-isocyanato-1-methyl-4(3)-isocyanatomethyl cyclohexane, 4,4'-dicyclohexylmethane diisocyanate, and combinations thereof.

As used herein, all percents are by weight unless otherwise specified, "ppm" designates "parts per million", and all temperatures are in "degrees Centigrade" unless otherwise specified.

The following examples are intended to illustrate, but in no way limit the scope of, the present invention.

EXAMPLE 1

Preparation of Macromonomer A via a Total CAOS (Continuous Addition of Starter) Process To a 300-gallon stainless steel pressure reactor, 250 lbs. of toluene (as a solvent), 245 g. BHT and 13.5 grams of DMC catalyst were added. The DMC catalyst is a zinc hexacyanocobaltate catalyst as produced by Example 2 of U.S. Pat. No. 5,482,908; and this patent is incorporated herein by reference in its entirety. The reactor was stripped with nitrogen at room temperature for 10 minutes. After stripping, the reactor was kept under vacuum and was heated up to 100° C. HPMA was then fed into the reactor at 0.141 lb/min while both PO and EO are fed at 0.918 lb/min respectively. After 18.4 lbs. PO was fed into the reactor (20-min after the feeding started), all the feeds were turned off, and the reactor was let to cook out. After the reactor reached half pressure, the reactor was cooled down to 90° C., all feeds (HPMA, EO, and PO) were resumed at the twice the previous feed rates. Finally, after 4 hrs feeding of HPMA, EO and PO, all the feeds were closed again for 30 minutes to cook out. Additional BHT (300 g) was added to the reactor and the reactor was stripped under full vacuum for 3 hrs at 130° C. to remove the residual oxides and toluene. After the stripping, the reactor was cooled down and additional BHT (250 g) was added to the reactor. Finally the product, Macromonomer A, was drained to the containers.

EXAMPLE 2

Preparation of Macromonomer B via a Total CAOS Process

To a 300 gallon stainless steel pressure reactor, 220 lbs. Macromonomer A, 490 g of BHT and 26.9 grams of DMC catalyst as described in Example 1 were added. The reactor was stripped with nitrogen at 100° C. for 40 minutes. After stripping the reactor was kept under vacuum and was maintained at 100° C. HPMA was then fed into the reactor at 0.144 lb/min while both PO and EO were fed at 0.937 lb/min respectively. After 18.74 lbs. PO was fed into the reactor (20-min after the feeding started), all the feeds were turned off, and the reactor was let to cook out. After the reactor reached half pressure, the reactor was cooled down to 90° C., all feeds (HPMA, EO, and PO) were resumed at twice the previous rates. Finally, after 8 hrs feeding of HPMA, EO and PO, all the feeds were closed again for 30 minutes cook out. The reactor was stripped under full vacuum for 30 minutes to remove the residual oxides at 90° C. After the stripping the reactor was cooled down and additional BHT (485 g) was added to the reactor. Finally the product, Macromonomer B, was drained to the containers.

COMPARISON EXAMPLE 3

Preparation of Macromonomer C via a Semi-Batch Process

To a one-liter stainless steel pressure reactor, 54 g. of HPMA, 50 g of toluene, 0.5 g. BHT, 0.2 g of benzoquinone, and 0.12 g DMC catalyst as described in Example 1 were added. The reactor was stripped for 5 minutes at room temperature. After stripping, the reactor was kept under vacuum and was heated up to 100° C. Both PO and EO are fed into the reactor at 1.5 g/min respectively. After 10 g of PO was fed into the reactor (6.5 minutes after the feeding started), both the EO and PO feeds were turned off, and the reactor was let to cook out. After the reactor reached half pressure, both feeds (EO and PO) were resumed at the same feed rate of 1.5 g/min. Finally, after 4 hrs feeding of both EO (total of 348 g) and PO (total of 348 g), both the feeds were closed again for 30 minutes cook out. The reactor was stripped under full vacuum for 60 minutes at 100° C. to remove the residual oxides and toluene. After the stripping, the reactor was cooled down. Finally the product, Macromonomer C, was drained to the containers.
Analytical Results Comparison of the Three Samples

| Sample | Process | Diol | Viscosity | OH# | Mw/Mn |
|---|---|---|---|---|---|
| Example 1 | Total CAOS | 0.00% | 388 cSt | 28.4 | 1.29 |
| Example 2 | Total CAOS | 0.00% | 401 cSt | 27.7 | 1.27 |
| Comp Ex 3 | Semi-batch | 3.75% | 312 cSt | 28.2 | 1.28 |

From above table, it is clear that the total CAOS process gives low diol content, as compared to the semi-batch methodology. Since lower diol content corresponds to a lower dimethacrylate content, higher performance in the Standard Slump Test is obtained with the macromonomer prepared by the total CAOS process, as compared with the results achieved using a macromonomer prepared by the non-CAOS process.

EXAMPLE 4

Preparation of Concrete Water Reducing Additive (WRA) from Macromonomer B (A Total CAOS Product)

A 250 ml, 3 neck flask with a thermowell and side arm overflow tube was used. The working volume of the reactor was about 175 mL. Three different feeds were co-fed to the reactor. The initiator, a 2.5% solution of ammonium persulfate in water, was fed from an ISCO pump at 12.5 mL per hour. A mixture of 650 g Macromonomer B, 94.0 g acrylic acid and 456 g water was fed from a reservoir at 100 g/hour. The reactor was initially charged with 40 g distilled water and then the feeds were started and the reaction mixture was heated to 40° C. with continuous feed for six hours. Reactor effluent collected during the first five hours of operation was discarded. Product during the next two hours was collected and evaluated in the slump test described below.

COMPARISON EXAMPLE 5

Preparation of Concrete WRA from Macromonomer C (Using a Semi-Batch Method)

A 250 mL, 3 neck flask with a thermowell and a side arm overflow tube was used. The working volume of the reactor was about 175 mL. Three different feeds were co-fed to the reactor. The initiator, a 2.5% solution of ammonium persulfate in water, was fed from an ISCO pump at 12.5 mL per hour. A 4.4% aqueous solution of mercaptoacetic acid was fed from a second ISCO pump at 12.5 mL per hour. A mixture of 650 Macromonomer C, 94.0 g acrylic acid and 456 g water was fed from a reservoir at 100 g/hour. The reactor was initially charged with 40 g of distilled water and then the feeds were started and the reaction mixture was heated to 40° C. with continuous feed for six hours. Reactor effluent collected during the first five hours of operation was discarded. Product during the next two hours was collected and evaluated in the slump test.
The Standard Slump Test:

The reaction products were tested in mortar mixes by using the slump test as described by ASTM method C-143. The method was modified in this case by using mortar in place of concrete and the slump cone was scaled by one-half in its dimension. In a typical test at a 25% water cut, 290 g water, 760 g cement and 1755 g dried mortar sand were mixed together with the admixture for 5 min and then the slump test was performed.
Comparison of the Slump Test Results for the WRA Made from the Polyether Methacrylates Prepared via Total CAOS and Semi-Batch Processes

| Additive | Water/Cement | Wt % additive on dry cement | Slump, mm | Flow, mm |
|---|---|---|---|---|
| None | 0.38 | 0 | >20 | NA |
| Example 4 (total CAOS macromonomer) | 0.38 | 0.16 | 130 | 239 |

-continued

| Additive | Water/ Cement | Wt % additive on dry cement | Slump, mm | Flow, mm |
|---|---|---|---|---|
| Comparison Example 5 (semi-batch macromonomer) | 0.38 | 0.16 | 126 | 196 |

Typically, higher slump and flow translate into higher water reducing performance for the product. These results demonstrate that the macromonomer made through the total CAOS process, in accordance with the present invention, performs better as a WRA than the macromonomer made through the semi-batch process.

One or more embodiments of the present invention have been described. Nevertheless, it will be understood that various modifications may be made without departing from the spirit and scope of the invention. Accordingly, other embodiments are within the scope of the following claims.

What is claimed is:

1. A process for making concrete, said process comprising:
    (a) reacting a hydroxyalkyl acrylate or hydroxyalkyl methacrylate with an alkylene oxide in the presence of a double metal cyanide catalyst at a reaction temperature within the range of about 60° C. to about 130° C. by continuously feeding both the hydroxyalkyl acrylate or hydroxyalkyl methacrylate and the alkylene oxide into a reactor to produce a macromonomer having essentially no diol content;
    (b) producing a copolymer of the macromonomer and a monomer selected from the group consisting of acrylic acid, methacrylic acid, fumaric acid, styrene, maleic acid or anhydride, methyl methacrylate, and mixtures thereof; and
    (c) mixing the copolymer, as a water reducing additive, with cement, sand, and water to form concrete; said water being present in an amount less than the amount necessary to form concrete in the absence of the copolymer.

2. A process of producing water-dispersed polyurethane, said process comprising:
    (a) reacting a hydroxyalkyl acrylate or hydroxyalkyl methacrylate with an alkylene oxide in the presence of a double metal cyanide catalyst at a reaction temperature within the range of about 60° C. to about 130° C. by continuously feeding both the hydroxyalkyl acrylate or hydroxyalkyl methacrylate and the alkylene oxide into a reactor to produce a macromonomer having essentially no diol content;
    (b) producing a copolymer of the macromonomer and a monomer selected from the group consisting of acrylic acid, methacrylic acid, fumaric acid, styrene, maleic acid or anhydride, methyl methacrylate, and mixtures thereof; and
    (c) reacting the copolymer with an isocyanate to produce a water-dispersible polyurethane.

* * * * *